United States Patent [19]
Broadbent

[11] 4,002,312
[45] Jan. 11, 1977

[54] TRUNCATED AEROFOILS HAVING SPANWISE SPLITTERS

[75] Inventor: Edward Granville Broadbent, Farnham, England

[73] Assignee: The Secretary of State for Defence in Her Britannic Majesty's Government of the United Kingdom of Great Britain and Northern Ireland, London, England

[22] Filed: Sept. 5, 1975

[21] Appl. No.: 610,849

[30] Foreign Application Priority Data

Sept. 6, 1974 United Kingdom ............ 39127/74

[52] U.S. Cl. .......................... 244/40 R; 244/42 CC
[51] Int. Cl.² ........................................ B64C 23/00
[58] Field of Search ............... 244/40 R, 40 A, 41, 244/130, 35 R, 42 CE, 42 CC; 415/DIG. 1

[56] References Cited
FOREIGN PATENTS OR APPLICATIONS 1,272,728    7/1968    Germany .......................... 244/40 A Primary Examiner—Trygve M. Blix
Assistant Examiner—Barry L. Kelmachter
Attorney, Agent, or Firm—Cameron, Kerkam, Sutton, Stowell & Stowell

[57] ABSTRACT

An aerofoil for use in transonic conditions is truncated aft of the point of maximum thickness and has a splitter extending downstream of the trailing edge and dividing the trailing edge into two sections. Each section has a concavely or a substantially parabollically contoured surface. The aerofoil comprises fans or outlets adjacent the downstream end of the splitter for inducing in each section a zone of recirculatory flow in the region bounded by the splitter, the surface and a boundary streamline of free stream airflow over the aerofoil, the recirculatory flow adjacent the splitter being upstream relative to the free stream airflow.

4 Claims, 5 Drawing Figures

TRUNCATED AEROFOILS HAVING SPANWISE SPLITTERS

The present invention relates to aerofoils, particularly wings, for aircraft.

It is known that there are advantages in designing wings, for use in transonic conditions (that is, in conditions where airflow over the wings becomes supersonic although the wings are travelling subsonically), with blunt trailing edges. A wing with a blunt trailing edge has greater lift efficiency in transonic conditions. Also, if the trailing edge is situated just behind the position of maximum wing thickness the section is structurally stronger than a conventional wing, so allowing the use of higher aspect ratios with their smaller induced drag.

Unfortunately the advantages of such a wing are offset by the base drag of the blunt trailing edge. When the wing is passing through air the pressure behind the trailing edge (the base pressure) is lower than the free stream air pressure. It seems likely that, apart from the base drag inherent in this pressure differential, drag is caused by the periodic shedding of vortices from unstable recirculatory air patterns caused by air being drawn from the free stream towards the low base pressure area. The shedding of vortices, and the strength of the shed vortices, can be reduced by the use of a spanwise splitter plate extending downstream from midpoint of the trailing edge. The resultant base pressure with a splitter plate is still too large for this type of wing to be a practical proposition.

According to the present invention an aerofoil truncated aft of the point of maximum thickness has a spanwise splitter extending downstream of a trailing edge and dividing the trailing edge into two sections, each section being contoured to encourage, in use, establishment of a recirculatory airflow in the region bounded by the splitter, the trailing edge, and a boundary streamline of free stream airflow over the aerofoil, and means for energising the recirculatory flow.

Preferably the means for energising the recirculatory flow comprise a plurality of fans mounted on the downstream end of the splitter and arranged to blow air in the upstream direction. Alternatively air can be blown in the upstream direction from outlets adjacent the downstream end of the splitter.

In order that the advantages of the invention be appreciated, some embodiments will now be described, by way of example only, with reference to the accompanying diagrammatic drawings, of which:

It should be realised that in this specification, as is usual for convenience in aerodynamic discussion, air is referred to as moving past an aerofoil although in practice the aerofoil will move through the air.

Figure 1A:
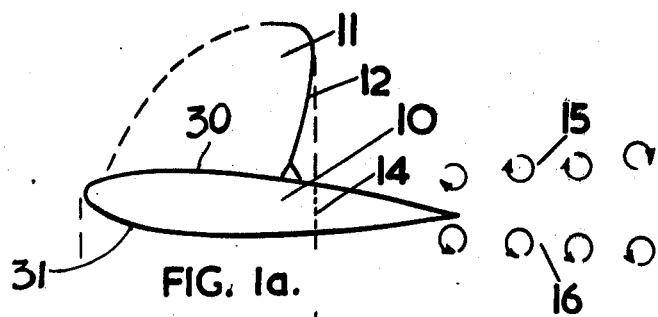
FIGS. 1a and 1b show the flow pattern over a two-dimensional aerofoil at transonic speeds.

Consider an aerofoil 10 (FIG. 1a) having an upper surface 30 and a lower surface 31 in an airstream moving at a high subsonic speed. As the air accelerates over the cambered upper surface 30 of the aerofoil 10 it becomes supersonic. A region of supersonic flow, indicated at 11 in FIG. 1a, terminating at a shock 12, is formed.

Figure 1B:
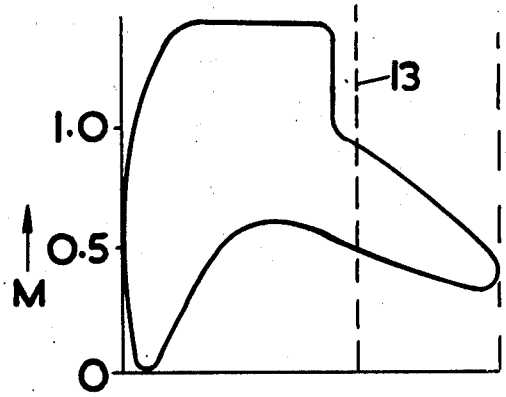

The velocity distribution, in terms of Mach Number, over the aerofoil 10 is plotted in FIG. 1b. The pressure p over the aerofoil is given by the well-known formula $$p = p_\infty \left\{ \frac{1 + \frac{1}{2}(\gamma - 1) M_\infty^2}{1 + \frac{1}{2}(\gamma - 1) M^2} \right\}^{\frac{\gamma}{\gamma - 1}} \quad (1)$$

where $p_\infty$ is the free stream pressure, $M_\infty$ the free stream Mach Number, M the local Mach number and $\gamma$ the ratio of specific heats. It will be seen therefore that most of the lift generated at the upper surface 30 of the aerofoil 10 is obtained over the area where the local airflow is supersonic. Maximum lift efficiency can therefore be obtained, as indicated by the line 13, by truncating the aerofoil 10 aft of the shock 12 to leave a blunt trailing edge 14 as indicated by the chain dotted line on FIG. 1a. However, the pressure $p_o$ at the trailing edge 14 is lower than the free stream pressure $p_\infty$, causing drag. Also air is attracted from the free stream towards the low pressure $p_o$, causing an unstable recirculatory pattern at the trailing edge 14 which sheds streams of vortices as indicated at 15, 16.

Figure 2:
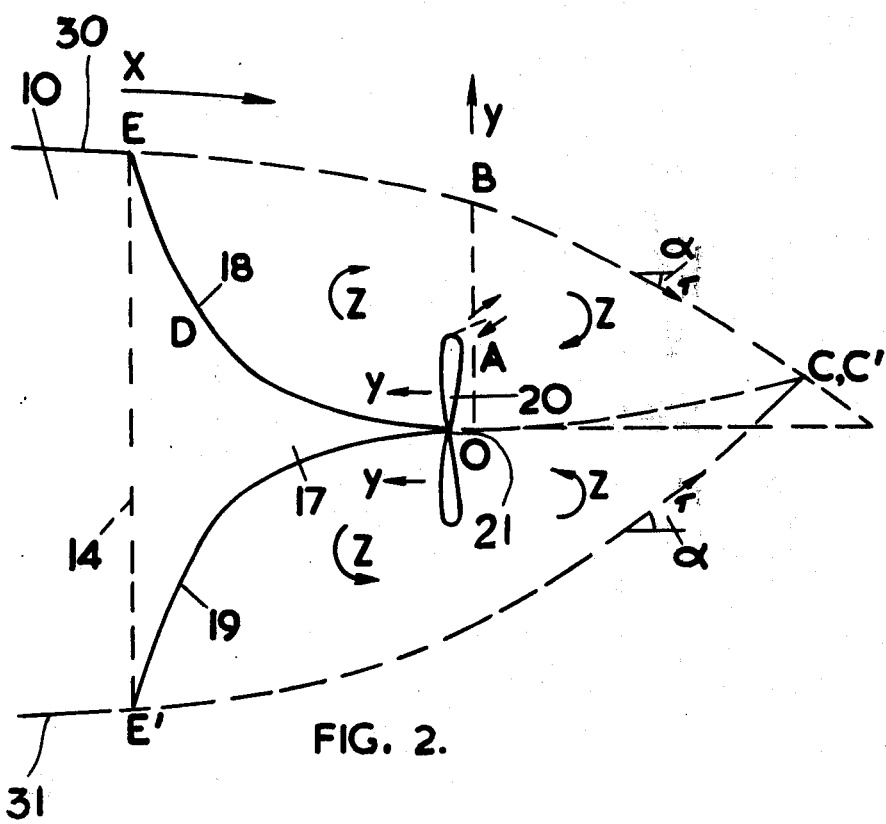
FIG. 2 shows in cross-section a trailing edge of a wing embodying one embodiment of the invention.

In the present invention an aerofoil 10 (FIG. 2) has, at a position 14 aft of the point of maximum thickness, a discontinuity E in the upper surface 30 and a discontinuity E' in the lower surface 31. A spanwise splitter 17 extends from the discontinuities E and E' to a trailing edge 21, the splitter 17 having a concave surface 18 between E and 21 and a concave surface 19 between E' and 21. At the trailing edge 21 of the splitter 17 are a plurality of fans such as the fan shown at 20.

In operation, when an airflow is passing over the aerofoil 10 as indicated by the arrow X the fans are driven to propel air in the upstream direction, as indicated by the arrows Y. The fans therefore energise the recirculatory flow forming at the position 14, increasing the pressure acting on the surfaces of sections 18, 19 and stabilising the flow pattern to prevent the breakaway of vortices such as those shown at 15, 16 in FIG. 1. In effect, stable areas of recirculatory flow as indicated by the arrows Z are established in the regions O D E B C O, O E' C' O.

It will be realised that as the fans are driving air in the upstream direction, their operation is drag inducing. However, this drag is compensated for by the fact that the air is turned back downstream.

Figure 3:
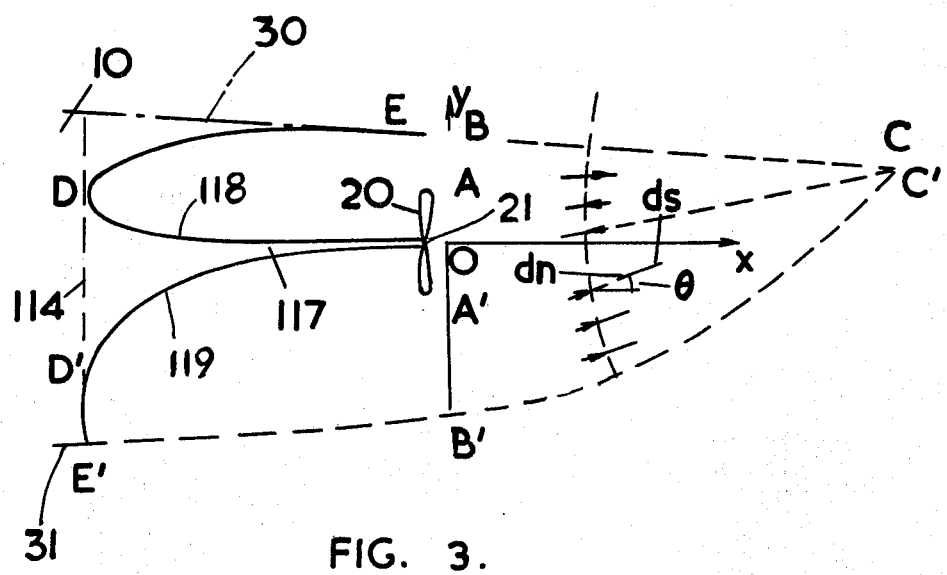
FIG. 3 shows in cross-section a trailing edge of another wing embodying another embodiment of the invention.

In another embodiment of the invention (FIG. 3) a splitter 117 is situated more than half-way up the position 14 and the upper section 118 is formed with a substantially parabollic surface contour.

The fans 20 may be driven mechanically, pneumatically, hydraulically or electrically, as is most convenient in a particular installation. It will be appreciated that the depth of the aerofoil 10 at the position 14 allows plenty of room within the aerofoil for installation of the fan drive means.

As an alternative to fans, the recirculatory flow can be energised by blowing gas in the upstream direction from outlets adjacent the trailing edge 21 of the splitter 17 or 117.

Figure 4:
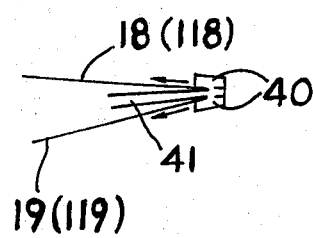
FIG. 4 shows a detail of an alternative embodiment of the invention.

FIG. 4 shows a detail of a trailing edge 21 of a splitter 17 or 117 having gas outlets 40 connected to a gas supply pipe 41 within the splitter. In operation, gas which may be, for example, air tapped from a compressor of a gas turbine engine or exhaust gas from the turbine of the gas turbine engine, is supplied through the pipe 41 and blown through the outlets 40 in an upstream direction along the surfaces 18, 19 or 118, 119.

What I claim is:

1. An aerofoil comprising: an upper surface and a lower surface and having on each surface, aft of the point of maximum thickness of the aerofoil, a discontinuity; a spanwise splitter extending downstream of said discontinuities to a trailing edge, there being between each of said discontinuities and said trailing edge a concavely contoured surface; and a plurality of fans mounted on said trailing edge and arranged to blow air over said concave surfaces in the upstream direction relative to free stream airflow over the aerofoil.

2. An aerofoil comprising: an upper surface and a lower surface and having on each surface, aft of the point of maximum thickness of the aerofoil, a discontinuity, a spanwise splitter extending downstream of said discontinuities to a trailing edge, there being between each of said discontinuities and said trailing edge a concavely contoured surface; and having outlets mounted on the trailing edge of the splitter and facing in the Edward Granville Broadbent, Ser. No. 610,849 upstream direction, and means for blowing gas through said outlets in the upstream direction.

3. An aerofoil comprising: an upper surface and a lower surface having on each surface, aft of the point of the aerofoil's maximum thickness, a discontinuity; a spanwise splitter extending downstream of said discontinuities to a trailing edge, there being between said discontinuity in said upper surface and said trailing edge a substantially parabolically contoured surface, and between said discontinuity in said lower surface and said trailing edge a concavely contoured surface; and a plurality of fans mounted on said trailing edge and arranged to blow air over said parabolic and concave surfaces in the upstream direction relative to free stream airflow over the aerofoil.

4. An aerofoil comprising: an upper surface and a lower surface having on each surface, aft of the point of the aerofoil's maximum thickness, a discontinuity; a spanwise splitter extending downstream of said discontinuities to a trailing edge, there being between said discontinuity in said upper surface and said trailing edge a substantially parabolically contoured surface, and between said discontinuity in said lower surface and said trailing edge a concavely contoured surface; having gas outlets mounted on the trailing edge of the splitter and facing in the upstream direction, and means for blowing gas through said outlets in the upstream direction.

* * * * *